(12) United States Patent
Uozumi (10) Patent No.: US 12,117,526 B2
(45) Date of Patent: Oct. 15, 2024

(54) DISPLACEMENT METER AND ARTICLE MANUFACTURING METHOD

(71) Applicant: CANON KABUSHIKI KAISHA, Tokyo (JP)

(72) Inventor: Takayuki Uozumi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 953 days.

(21) Appl. No.: 17/144,511

(22) Filed: Jan. 8, 2021

(65) Prior Publication Data

US 2021/0231802 A1 Jul. 29, 2021

(30) Foreign Application Priority Data

Jan. 28, 2020 (JP) .................................. 2020-011350

(51) Int. Cl.
*G01S 17/08* (2006.01)
*G01B 11/02* (2006.01)

(52) U.S. Cl.
CPC ............ *G01S 17/08* (2013.01); *G01B 11/028* (2013.01)

(58) Field of Classification Search
CPC ........ G01S 17/08; G01S 7/4811; G01S 17/58; G01S 7/4808; G01S 7/4863; G01B 11/028; G01B 2290/70; G01B 11/14; G01B 11/2441; G01B 9/02039; G01B 9/02057; G01B 11/27; G01B 9/02061; G01B 11/026; G01B 11/043; G01B 9/02015; G01B 9/0209; G01B 2210/50; G01B 11/02; G01B 11/06; G01B 11/08; G01B 11/002; G01B 11/24; G01B 2210/56; G01B 11/25;
(Continued)

(56) References Cited

U.S. PATENT DOCUMENTS

| 5,606,174 A * | 2/1997 | Yoshimura | ............. G01B 11/24 |
| | | | 250/559.22 |
| 7,330,278 B2 * | 2/2008 | Iwamoto | ............. G01B 11/026 |
| | | | 356/614 |

(Continued)

FOREIGN PATENT DOCUMENTS

| JP | 2006300763 A | 11/2006 |
| JP | 6044125 B2 | 12/2016 |

*Primary Examiner* — Christina A Riddle
(74) *Attorney, Agent, or Firm* — ROSSI, KIMMS & McDOWELL LLP (57) ABSTRACT

A displacement meter includes: a light source; an illumination optical system which forms a light intensity distribution at a predetermined position on an optical axis by using light from the light source such that a light intensity at a peripheral portion of the light intensity distribution is stronger than a light intensity at a center portion of the light intensity distribution; a light deflection portion which has an opening on the optical axis and a reflection part reflecting light of the light intensity distribution formed by the illumination optical system at the predetermined position; a first lens unit which collects light reflected by the reflection part and illuminates a measurement object; a sensor array which detects light reflected by the measurement object and passing through the opening of the light deflection portion through the first lens unit; and a measurement unit which detects a displacement of the measurement object by using outputs of the sensor array at different timings.

18 Claims, 7 Drawing Sheets

(58) Field of Classification Search
CPC ............... G01B 9/02047; G01B 9/02083; G01B 9/021; G01B 11/022; G01B 11/0608; G01B 11/0641; G01B 11/245; G01B 11/255; G01B 11/26; G01B 11/272; G01B 9/02007; G01B 9/0205; G01B 9/02091; G01B 9/023; G01B 11/00–306; G01D 5/34715; G02B 27/1026; G02B 27/1033; G02B 27/143; G02B 6/29349; G01P 3/366; G01P 5/26; G01P 3/36; G01M 11/005; G01M 11/025; G01M 11/0271; G01M 11/00; G01M 11/02; G01J 9/02; G06T 7/70; G06T 7/521; G06T 17/00; G06T 2207/10056; G06T 2207/20056; G06T 2207/30148; G06T 5/00; G06T 5/73; G06T 5/80; G06T 7/55; G06T 7/557
USPC .................................. 356/601–640
See application file for complete search history.

(56) References Cited

U.S. PATENT DOCUMENTS

| | | | |
|---|---|---|---|
| 2003/0179387 A1* | 9/2003 | Uno ............... | G01B 11/026 356/624 |
| 2018/0313643 A1* | 11/2018 | Odaira ............ | G02B 21/086 |
| 2019/0302025 A1* | 10/2019 | Jung ............... | G01N 21/8806 |

* cited by examiner

DISPLACEMENT METER AND ARTICLE MANUFACTURING METHOD

BACKGROUND OF THE INVENTION

Field of the Invention

The present invention relates to a displacement meter and the like.

Description of the Related Art

As a method of measuring a displacement in an in-plane direction without contact, a laser Doppler type, a spatial filter type, and an image correlation type of calculating a displacement from a correlation of an image or a speckle with a laser are known. The laser Doppler type is applicable to various measurement objects and has a feature of good measurement accuracy. However, in a configuration based on an interferometer, since an acoustic optical element or an electro-optical element is required to measure a stationary state and determine a moving direction, it is difficult to configure this configuration at a low cost.

Although the spatial filter type can be constructed at a low cost, the optimum spatial filter differs depending on the measurement object and the stationary state and the moving direction are not easily determined. The image correlation type can determine the stationary state and the moving direction and can be configured at a relatively low cost using an image sensor that has become popular in recent years. The present invention relates to a displacement meter of an image correlation type or the like.

Figure 9:
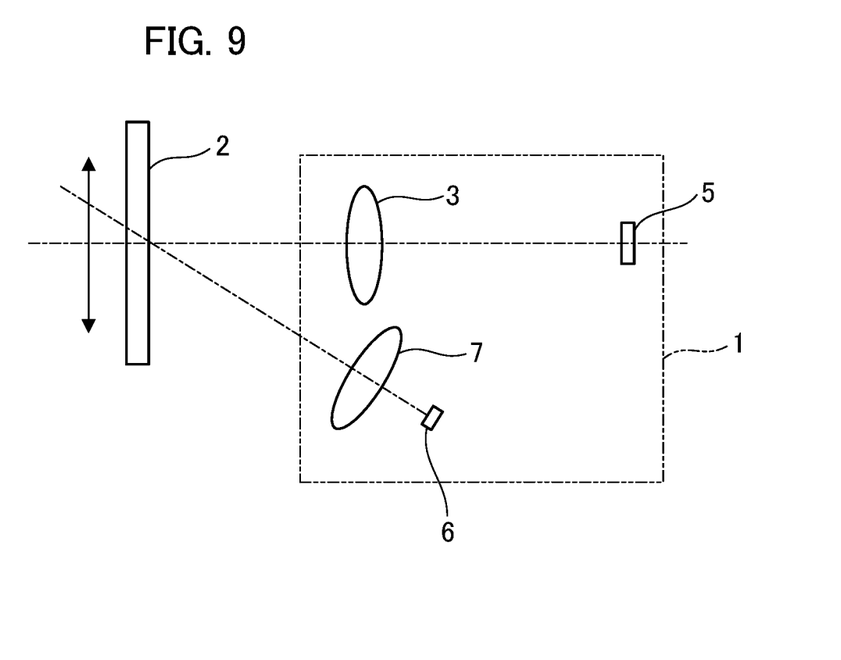
FIG. 9 is a configuration diagram of a conventional displacement meter.

As a conventional non-contact in-plane displacement meter of an image correlation type, a device shown in FIG. 9 is known. FIG. 9 is a diagram showing an example of the conventional non-contact in-plane displacement meter. This conventional non-contact in-plane displacement meter emits illumination light to a measurement object from an inclined direction, receives scattered light from a measurement object surface from a substantially perpendicular direction, and measures displacement based on an image acquired by an image sensor (see Japanese Patent No. 6044125).

Figure 10:
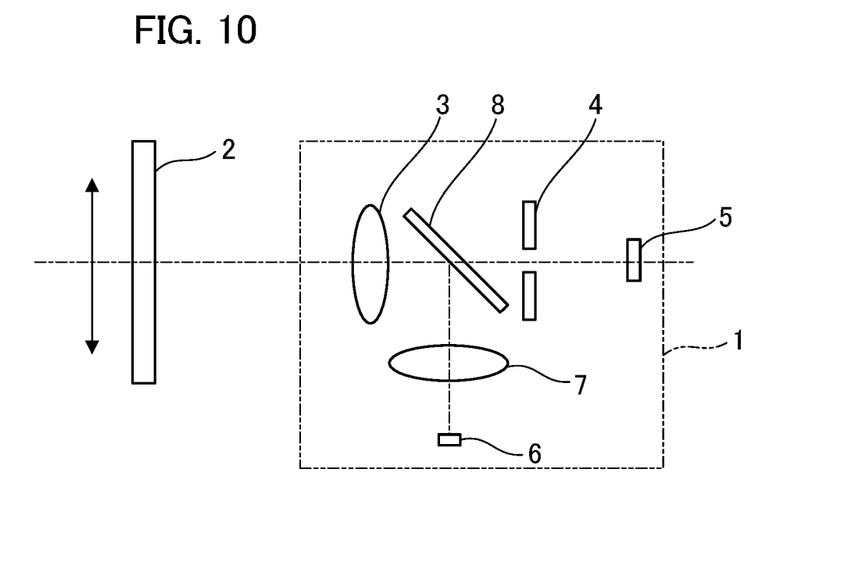
FIG. 10 is a configuration diagram of a conventional displacement meter.

Further, FIG. 10 is a diagram showing another conventional non-contact in-plane displacement meter of an image correlation type which is different from the above-described example. In this type, a coaxial epi-illumination optical system is used to illuminate the laser beam from a direction substantially perpendicular to the measurement object, scattered light from the measurement object is received from a substantially perpendicular direction, and displacement is measured based on a speckle image acquired by an image sensor (see Japanese Patent Laid-Open No. 2006-300763).

In the type of Japanese Patent No. 6044125, a sufficient light amount can be obtained if the measurement object is isotropic in the angular distribution of the reflected light with respect to the incident light flux as in plain paper. On the other hand, if the measurement object has a relatively strong specular reflection component such as metal (the angular distribution of the reflected light has anisotropy), it may be difficult to obtain a sufficient light amount. In order to measure even a measurement object such as metal, it is necessary to sufficiently increase the amount of illumination light, but the heat generated by the light source limits the operating temperature range of the device. Further, there is a problem that the life of the light source is shortened.

Although it is possible to increase the amount of acquired light if the incident angle of the illumination light is small, it is necessary to consider the physical interference between the illumination optical system and the light receiving optical system. As a result, a problem arises in that there is a limitation in design. Although there is a method of arranging the light receiving optical system as a regular reflection with respect to the illumination optical system in order to obtain the specular reflection component, a problem arises in that displacement desired to be measured and a displacement according to a change in working distance cannot be determined if the distance (working distance) between the displacement meter and the measurement object changes.

On the other hand, in the type of Japanese Patent Laid-Open No. 2006-300763, it is possible to acquire a sufficient light amount even for the measurement object such as metal described above by adopting the coaxial epi-illumination optical system. However, since the coaxial epi-illumination optical system is configured by using a half mirror as the light deflection portion, about half of the light amount loss occurs at the time of illumination and light reception and the effective light amount is reduced to about ¼. Therefore, since it is necessary to increase the amount of illumination light as in the case of Patent Document 1, heat generation and life of the light source become problems. Further, the illumination light which is folded back by the half mirror generates reflected light at the same time if the illumination light enters the lens. The reflected light generated in the lens becomes a ghost of the light receiving optical system. In order to prevent this problem, as mentioned in Patent Document 2, polarizing optical elements such as a polarizer and a wave plate may be used, but cost increase is unavoidable.

SUMMARY OF THE INVENTION

The present invention relates to a displacement meter with high illumination efficiency that reduces the amount of light loss generated in an optical system.

A displacement meter according to an aspect of the present invention includes: a light source; an illumination optical system configured to form a light intensity distribution at a predetermined position on an optical axis by using light from the light source such that a light intensity at a peripheral portion of the light intensity distribution is stronger than a light intensity at a center portion of the light intensity distribution; a light deflection portion which has an opening on the optical axis and a reflection part configured to reflect light of the light intensity distribution formed by the illumination optical system at the predetermined position; a first lens unit configured to collect light reflected by the reflection part and illuminate a measurement object; a sensor array configured to detect light reflected by the measurement object and passing through the opening of the light deflection portion through the first lens unit; and a measurement unit configured to detect displacement of the measurement object by using outputs of the sensor array at different timings.

Further features of the present invention will become apparent from the following description of exemplary embodiments with reference to the attached drawings.

DESCRIPTION OF THE EMBODIMENTS

Hereinafter, preferred embodiments of the present invention will be described using embodiments with reference to the accompanying drawings. In each figure, the same members or elements are given the same reference numbers and duplicate descriptions are omitted or simplified.

First Embodiment

Figure 1:
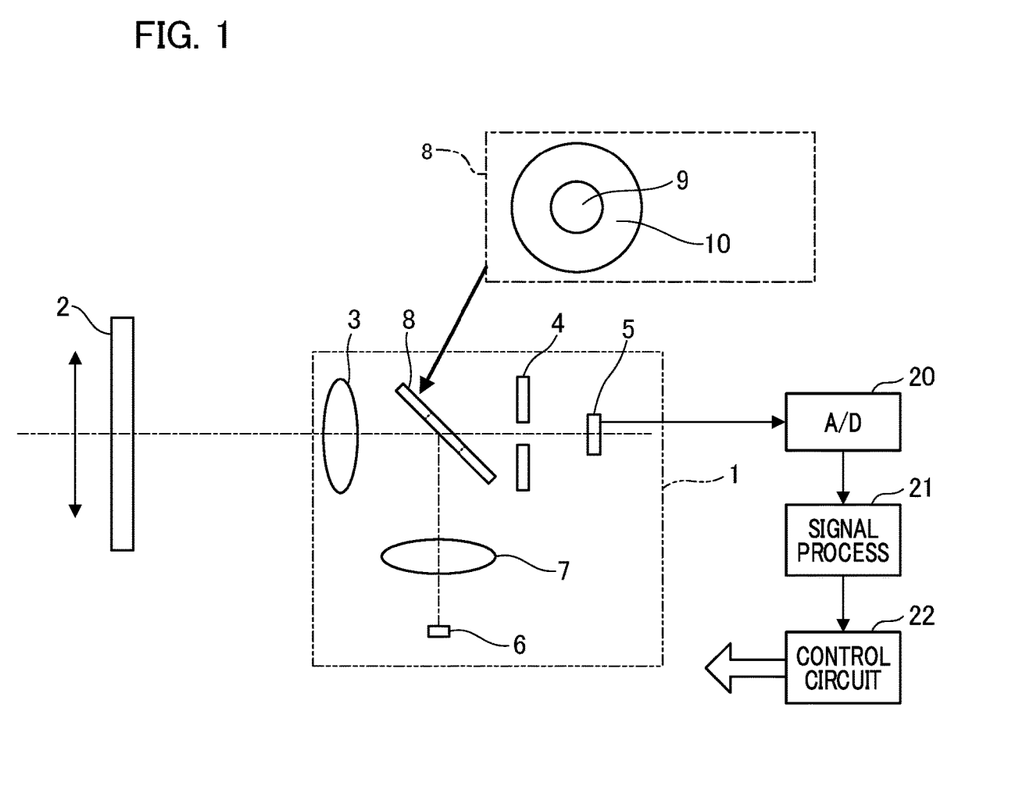
FIG. 1 is a configuration diagram of a displacement meter of a first embodiment.

FIG. 1 is a configuration diagram of a displacement meter of a first embodiment. In this embodiment, a so-called non-contact in-plane displacement meter will be described as the displacement meter. As shown in FIG. 1, a displacement meter 1 is installed at a position substantially perpendicular to a measurement object 2 at a working distance and detects the displacement of the measurement object 2 indicated by an arrow. A light flux emitted from a light source 6 is collected by a condensing member 7 which is an illumination optical system, is reflected by a light deflection portion 8, and illuminates the measurement object 2 through a first lens unit 3. In this embodiment, as the light source 6, for example, an appropriate light source such as a laser diode is used.

In FIG. 1, each of the condensing member 7 and the first lens unit 3 is shown as a single lens, but they can be realized by combining a plurality of lenses.

Figure 2:
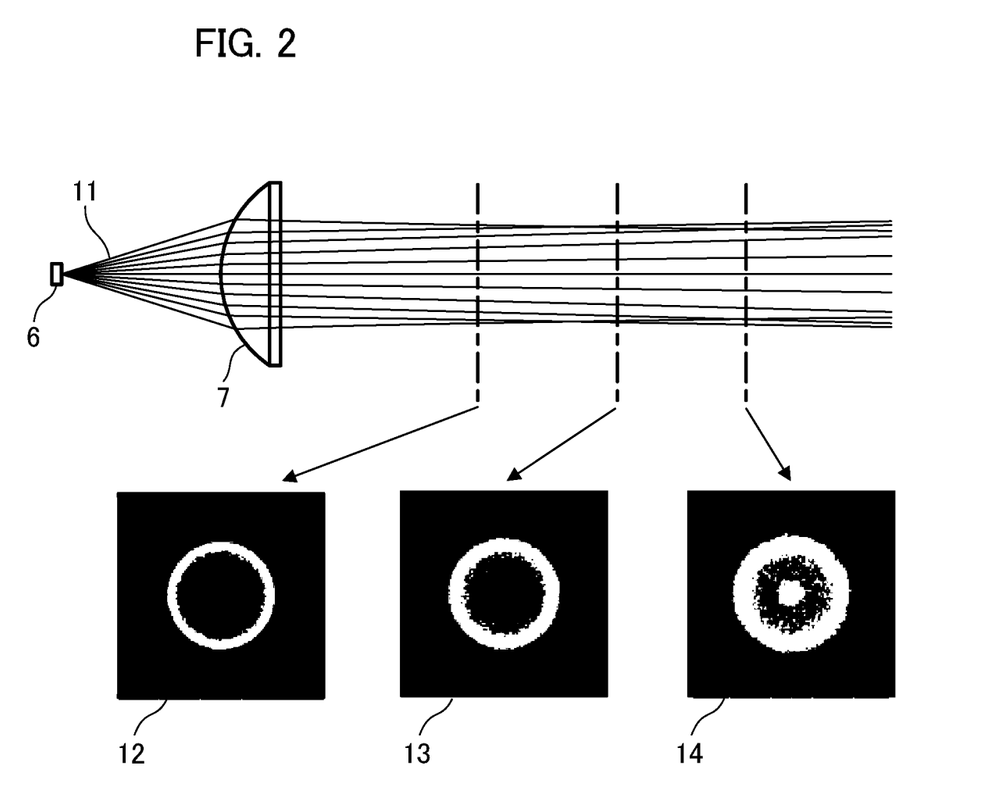
FIG. 2 is a diagram showing a cross-sectional intensity distribution of illumination light of the first embodiment.

FIG. 2 is a diagram showing a light amount distribution (intensity distribution) if the light flux emitted from the light source 6 is collected by the condensing member 7 made of a spherical lens so as to be approximately collimated light and is a schematic diagram showing a relationship between a distance from the condensing member 7 and a light amount distribution in a cross-section of a condensed light flux 11. The light amount distribution is expressed in a binarized form with the white part showing the state where the light amount is large and the black part showing the state where the light amount is small. In the vicinity of the lens of the condensing member 7, a light amount distribution 12 in the cross-section of the condensed light flux 11 becomes a ring-shaped light amount distribution due to spherical aberration.

The light amount distribution in the cross-section of the condensed light flux 11 becomes a light amount distribution 13 in which the light amount at the center portion of the ring increases as it goes away from the lens and becomes a light amount distribution 14 in which the light amount at the center portion has peaks as it goes further away therefrom. That is, the condensing member 7 functions as an illumination optical system which forms a ring-shaped light intensity distribution at a predetermined position on an optical axis by using light from the light source such that the light intensity at the peripheral portion is stronger than the light intensity at the center portion.

FIG. 2 shows an example in which a plano-convex lens is used as a specific example of generating a ring-shaped distribution due to spherical aberration. In this embodiment, a plano-convex lens having an outer diameter of 30 mm, a curvature radius of 18.17 mm, a center thickness of 9.9 mm, and a material of BK7 is used. The light amount distributions 12 to 14 shown in FIG. 2 are illumination simulation results if an LED light source having a diameter of ϕ3 mm is focused. In a general optical system, a light source is disposed on a flat side of a plano-convex lens to suppress spherical aberration. However, in this embodiment, a light source is disposed on a convex side to positively generate spherical aberration. In the light amount distribution 12 of FIG. 2, 90% or more of the light amount can be secured even if the center portion having a diameter of ϕ10 mm is excluded.

In this embodiment, the condensed light flux 11 is folded back to the light deflection portion 8 in the vicinity of the light amount distribution 12 in which the intensity distribution (the light amount distribution) in the cross-section of the condensed light flux 11 has a ring shape. As shown in FIG. 1, the light deflection portion 8 is configured as a mirror including a reflection part 10 having an opening 9 formed at the center portion (on the optical axis) and a ring shape in the peripheral portion. Most of the illumination light can be reflected by the reflection of the reflection part 10 of the light deflection portion 8 in the above-described ring-shaped intensity distribution state.

That is, the reflection part 10 of the light deflection portion 8 is configured to reflect light at a position in the periphery (the ring shape) of a predetermined optical axis position where the light amount distribution formed by the illumination optical system becomes the light amount distribution 12. Further, the first lens unit 3 collects the light reflected by the reflection part and illuminates the measurement object.

If a half mirror is used as the light deflection portion as in the conventional case, a light loss of about half occurs, but the configuration of this embodiment enables very efficient illumination.

Further, the angle of incidence of the illumination light on the measurement object 2 can be appropriately selected by the combination of the condensing member 7 and the first lens unit 3.

Figure 6A:
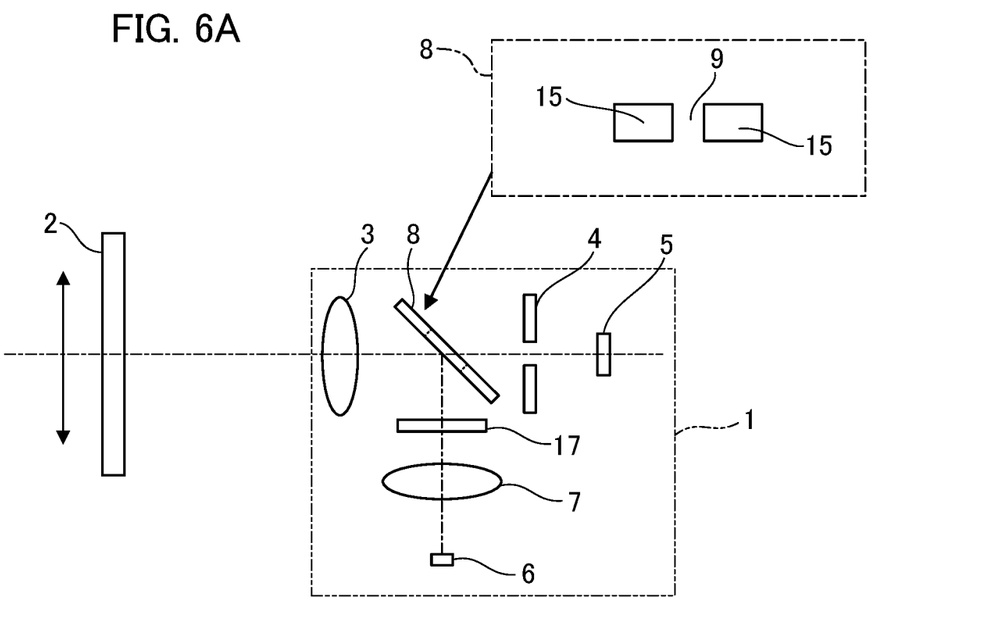
FIGS. 6A and 6B are configuration diagrams of a displacement meter of a fourth embodiment.
Figure 6B:
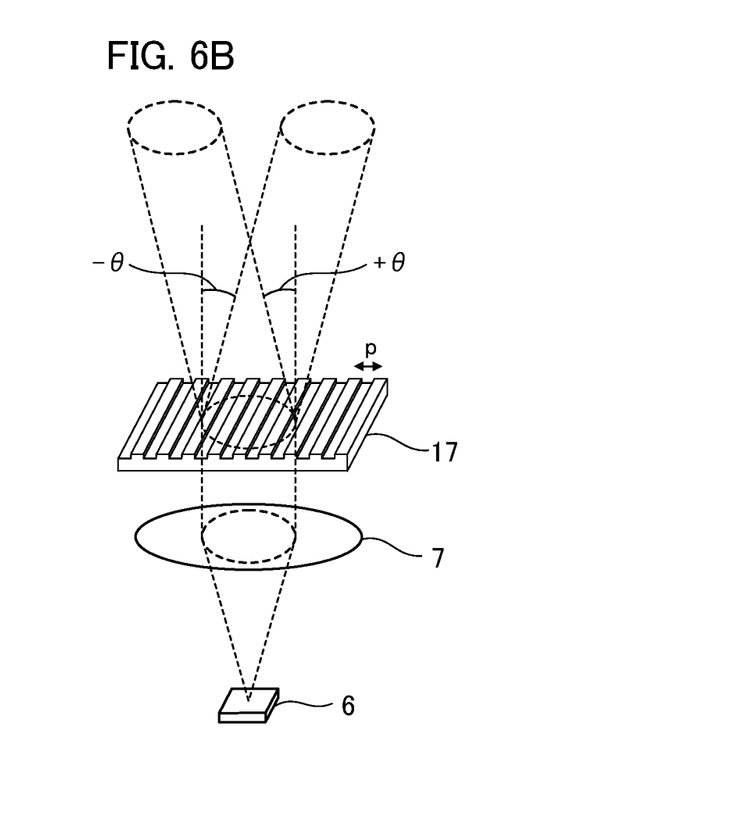

Although a method of forming the ring-shaped light amount distribution due to spherical aberration by using the spherical lens as the condensing member 7 has been described, here, an axicon lens, computer-generated hologram (CGH), or the like may be used. Further, a diffraction grating may be used as shown in the example of FIG. 6B.

The reflected light flux which is reflected and scattered by the measurement object 2 is collected by the first lens unit 3, further passes through an aperture stop 4 disposed in front of the light receiving surface of the sensor array 5 through the opening 9 of the light deflection portion 8, and enters the sensor array 5. Also in the light receiving optical system, a light amount loss of about half occurs if a half mirror is used as the light deflection portion as in a conventional case, but according to this embodiment, light can be received very efficiently.

Further, if a half mirror is used as the light deflection portion 8 as in a conventional case, a part of the light flux entering the first lens unit 3 becomes reflected light, passes through the aperture stop 4, and reaches the sensor array 5. As a result, a problem arises in that the reflected light adversely affects the measurement as stray light. In contrast, in this embodiment, if the ring-shaped light amount distribution reflected by the light deflection portion 8 enters the first lens unit 3, the light amount distribution at the center portion of the lens is substantially zero. Thus, the back surface reflection from the first lens unit 3 is also substantially zero and the stray light reaching the sensor array 5 is also substantially zero.

The aperture stop 4 is installed in the vicinity of the focal position of the first lens unit 3 so that the light receiving optical system including the first lens unit 3 and the aperture stop 4 becomes an object side telecentric optical system. The installation distance between the aperture stop 4 and the sensor array 5 is determined as the optimum imaging position from the design value of the working distance of the displacement meter and the size of the pixels constituting the sensor array 5 and the number of pixels to be used can be selected so as to match the size of the image determined from the desired field of view. The size of the opening 9 of the light deflection portion 8 is determined as a size that does not limit the received light flux determined from the above field of view.

In contrast, the working distance may be determined after determining the image size from the pixel size, the number of pixels, and the field of view of the sensor array 5 to be used and determining the installation distance between the aperture stop 4 and the sensor array 5. When the object side telecentric optical system is adopted in this way, the magnification of the image does not change substantially even if the working distance changes and hence robust measurement becomes possible.

Figure 3:
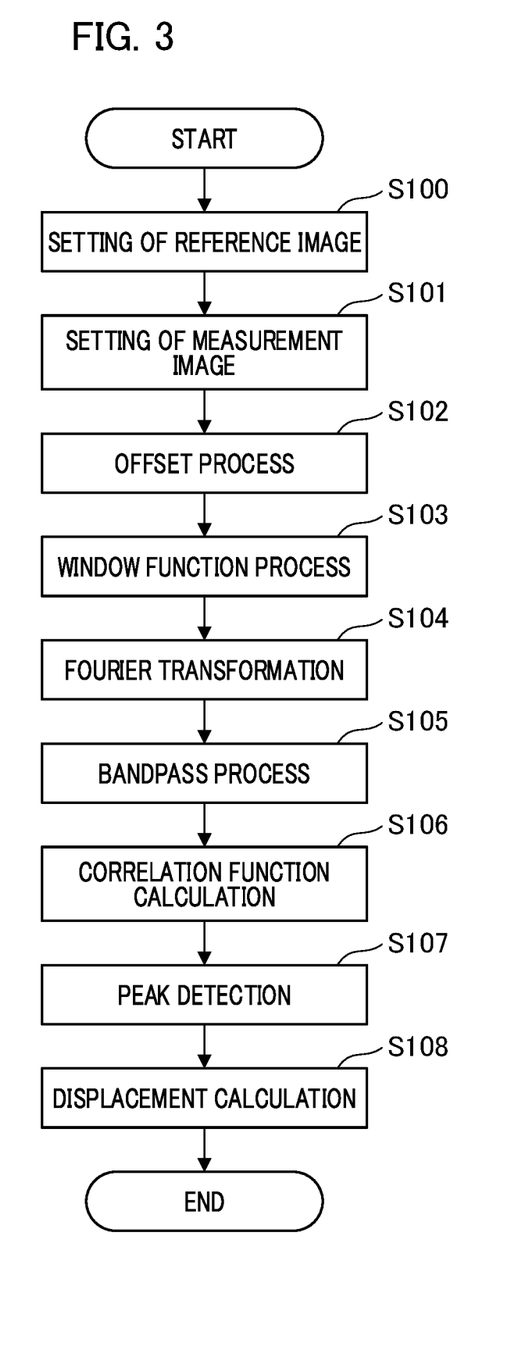
FIG. 3 is a flowchart of a measurement method of the first embodiment.

The light flux received by the sensor array 5 is photoelectrically converted, is AD-converted by an AD converter 20, is received by a signal processing unit 21 to be subjected to various correction processes, and is used to perform a measurement operation shown in the flowchart of FIG. 3 in the control circuit 22.

Additionally, the control circuit 22 has a built-in CPU as a computer and also functions as a control unit configured to perform various operations of the entire device based on a computer program stored in a memory (not shown). Further, the control circuit 22 may be accommodated in the same housing as the sensor array 5 or the like or may be disposed outside.

That is, the output of the signal processing unit 21 may be transmitted to the outside via a network or the like and may be received by an external PC via a network or the like. Then, the external PC may execute the function of the control circuit 22.

An example of the displacement calculation performed by the control circuit 22 is the flow shown in FIG. 3. The flow of FIG. 3 is executed if the CPU in the control circuit 22 processes a computer program stored in a memory (not shown).

FIG. 3 shows a flowchart of a measurement method.

The sensor array 5 continuously acquires images at a predetermined sampling rate. In step S100, if the measurement is started with a trigger input of a measurement start or the like, a reference image is set. Next, in step S101, images acquired from sensor array outputs at different timings according to a predetermined sampling rate are set as measurement images. Each set image is subjected to the subtraction of the offset component in step S102, multiplied by the window function in step S103, and then Fourier transformed in step S104. The offset component can be appropriately selected from the average value and the minimum value of the intensity information of the image. Further, as the window function, a Hann window, a hamming window, or the like can be appropriately selected.

Each Fourier transformed image is bandpass filtered in the range preset in step S105. The band of the bandpass filter can be set appropriately from the size of the average component that constitutes the image of the measurement object or the like. In step S106, the data in the frequency space of each image subjected to the bandpass filter is subjected to the correlation calculation by taking one of the conjugate complex numbers, multiplying the data, and then performing the inverse Fourier transform.

Next, the peak position of the correlation calculation result is detected in step S107. It is possible not only to use the maximum value as the peak of the correlation calculation result, but also to perform sub-pixel calculation from the information near the maximum value. It is possible to calculate (detect) the displacement amount of the measurement object by calculating displacement information based on the peak position in step S108 and reflecting the magnification of the optical system in the displacement information. Here, it is also possible to incorporate preset correction values from actual assembly errors or the like. It is possible to appropriately change the displacement calculation method with respect to the example shown in FIG. 3. Further, since the sampling time is known, it is also possible to calculate the velocity from the displacement at each sampling. Additionally, the control circuit 22 functions as a measurement unit detecting the displacement of the measurement object by performing the flow shown in FIG. 3.

As described above, the displacement meter of this embodiment has an excellent effect in which a sufficient light amount can be acquired regardless of the measurement object, light amount loss generated by the optical system is reduced, and robust measurement is possible regardless of a change in the working distance.

Second Embodiment

Figure 4:
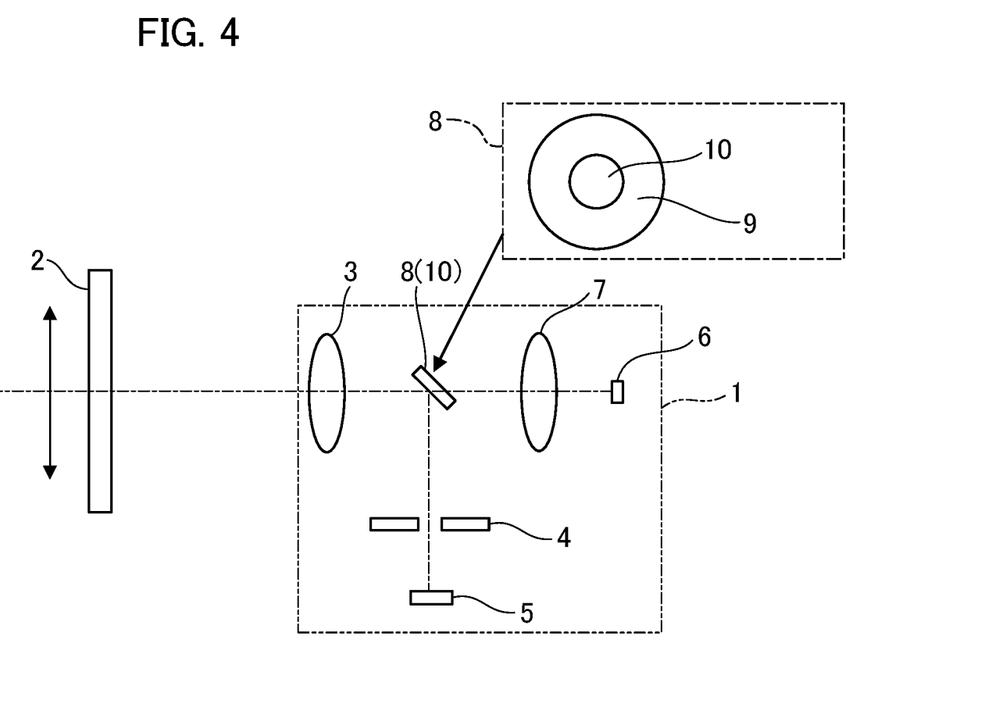
FIG. 4 is a configuration diagram of a displacement meter of a second embodiment.

Next, a displacement meter of a second embodiment will be described with reference to FIG. 4. FIG. 4 is a configuration diagram of the displacement meter of the second embodiment. As shown in FIG. 4, the displacement meter of this embodiment has a configuration in which the positions of the illumination optical system and the light receiving optical system are exchanged with respect to the first embodiment, the reflection part 10 of the light deflection portion 8 is provided at the center, and the opening 9 is provided at the peripheral portion. Additionally, a light shielding mask is disposed outside the opening 9. That is, the light deflection portion 8 guides the light of the light amount distribution formed by the illumination optical system to the measurement object through the opening provided in the peripheral portion. The same effect as that of the first embodiment can be obtained with this configuration.

However, since it is necessary to hold a mirror which is the reflection part 10 of the light deflection portion 8, a holding part shields the illumination light. As a result, there is a possibility that the efficiency is slightly lower than that of the configuration of the first embodiment.

Additionally, if a light shielding member such as a light shielding mask for defining the opening 9 is not disposed outside the opening 9, the light deflection portion 8 is configured as only the reflection part 10 and hence the opening 9 through which the ambient light of the reflection part 10 is transmitted can be simply referred to as a light transmitting part.

Third Embodiment

Figure 5:
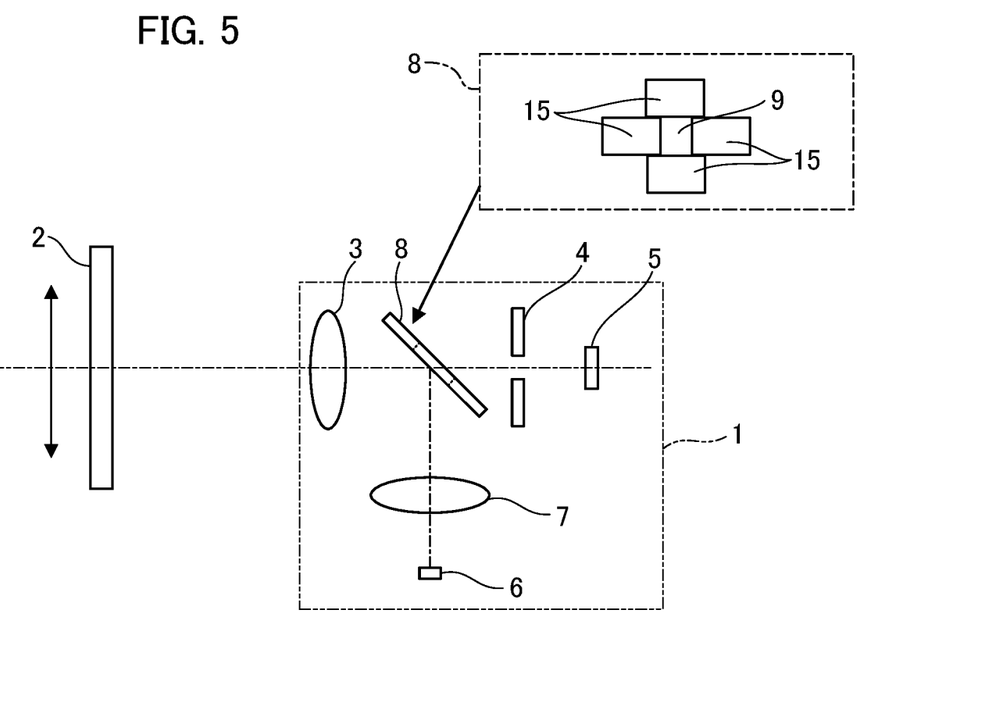
FIG. 5 is a configuration diagram of a displacement meter of a third embodiment.

Next, a displacement meter of a third embodiment will be described with reference to FIG. 5. FIG. 5 is a configuration diagram of the displacement meter of the third embodiment. As shown in FIG. 5, the displacement meter of this embodiment has a combination of, for example, four plane mirrors 15 having the light deflection portion 8 with the opening 9 provided at the center (on the optical axis) with respect to the first embodiment. The displacement meter can be configured at a lower cost than the first embodiment in which a hole is machined in a mirror. Additionally, the number of the plane mirrors 15 is not limited to four, but may be two or three or five or more. Further, the shape of the plane mirror 15 may not be a rectangular shape, but may be an arbitrary shape.

Fourth Embodiment

Next, a displacement meter of a fourth embodiment will be described with reference to FIGS. 6A and 6B. FIG. 6A is a configuration diagram of the displacement meter of the fourth embodiment and FIG. 6B is an enlarged view in the periphery of a diffraction grating. As shown in FIGS. 6A and 6B, the displacement meter of this embodiment is different from the first to third embodiments in that a diffraction grating 17 is included in the condensing member 7 which is the illumination optical system. Further, in FIG. 6A, Reference Numeral 15 denotes a plane mirror and in this embodiment, one plane mirror is disposed at a position where the plus or minus primary diffracted light is received. Reference Numeral 9 denotes an opening.

In this embodiment, the light source 6 uses a coherent light source such as a laser diode. The light flux emitted from the light source 6 is collimated by the condensing member 7 such as a collimating lens and is diffracted by the diffraction grating 17 as shown in FIG. 6B to form plus or minus primary diffracted light.

Here, if the wavelength of the coherent light source to be used is λ and the pitch of the diffraction grating 17 is p, the diffraction angle θ of the plus or minus primary diffracted light is can be obtained as $\theta = \arcsin(\lambda/p)$.

The light flux can be efficiently branched by designing a phase grating so as to maximize the intensity of the plus or minus primary diffracted light using the diffraction grating 17.

Fifth Embodiment

Figure 7:
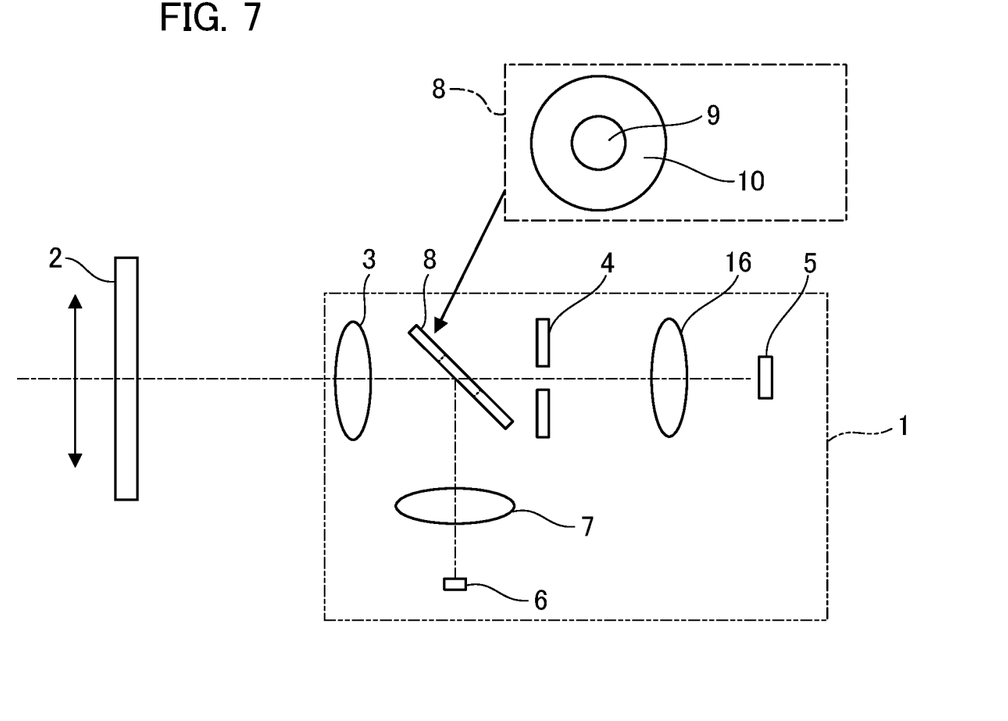
FIG. 7 is a configuration diagram of a displacement meter of a fifth embodiment.

Next, a displacement meter of a fifth embodiment will be described with reference to FIG. 7. FIG. 7 is a configuration diagram of the displacement meter of the fourth embodiment. As shown in FIG. 7, the displacement meter of this embodiment is different from the first to fourth embodiments in that a second lens unit 16 is provided in front of the light receiving surface of the sensor array 5 of the light receiving optical system. In the configuration of the first embodiment, the size of the image in the sensor array 5 was determined by the distance between the aperture stop 4 and the sensor array 5. In general, the sensor array 5 is mounted on a printed circuit board or the like. Since a dedicated adjustment mechanism or the like is necessary in order to position the printed circuit board or the holding member thereof in the optical axis direction, the configuration is complex.

On the other hand, if the configuration uses the second lens unit 16 as in this embodiment, the size of the image can be adjusted without changing the position of the sensor array 5. The second lens unit 16 includes one or a plurality of lenses and is held by a lens barrel component (not shown). The lens held by the lens barrel component is fixed after adjusting the position in the optical axis direction. Compared with the case where the sensor array 5 is positioned in the optical axis direction on the printed circuit board or the like on which the sensor array 5 is mounted, the configuration is simple and the adjustment is easy.

Further, the telecentric optical system can be configured on the sensor array side by using the second lens unit 16. In that case, the second lens unit 16 is installed so that its focal position matches the position of the aperture stop 4. The positions of the sensor array 5 and the second lens unit 16 may be determined as the optimum imaging position from the design value of the working distance as in the case of the first embodiment. Alternatively, the working distance may be determined by determining the size of the desired image from the specifications of the sensor array 5 to be used. In this way, robust measurement is possible even for a relative position change of the sensor array 5.

Additionally, in the object side telecentric optical system adopted in the first embodiment, an error due to the magnification fluctuation occurs if the relative position of the sensor array 5 changes due to the influence of environmental temperature change, vibration, impact, or the like. However, it is possible to perform robust measurement not only for the relative position change on the object side but also for the relative position change of the sensor array 5 by applying the fifth embodiment to configure the telecentric optical system on both sides of the object side and the sensor side. The second lens unit 16 as in this embodiment may be applied to the configuration described in another embodiment.

Sixth Embodiment

Figure 8:
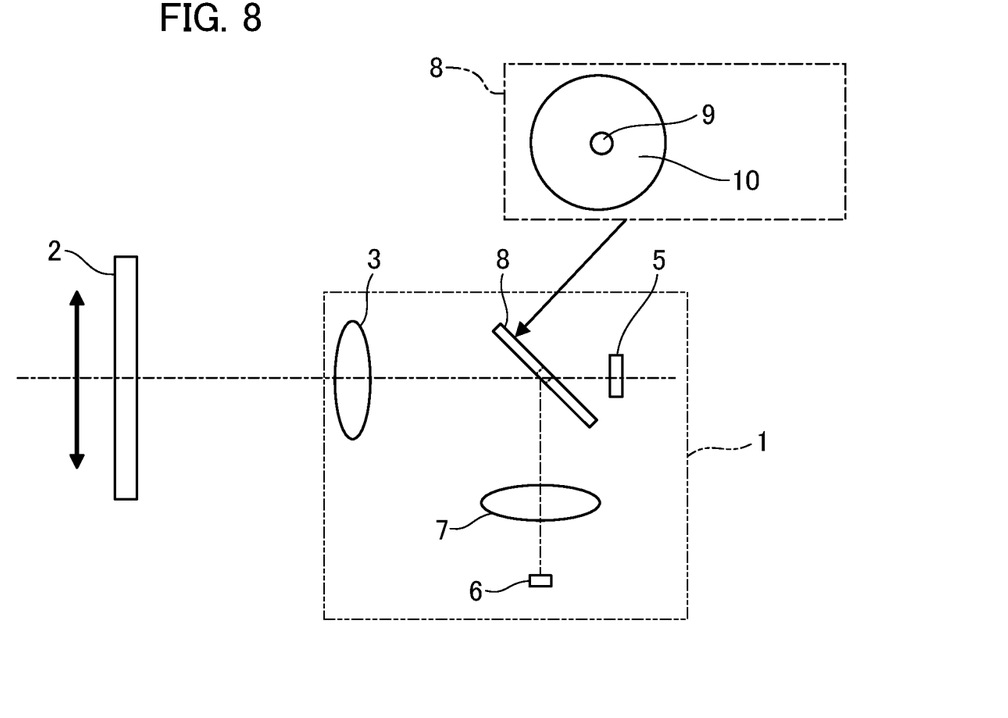
FIG. 8 is a configuration diagram of a displacement meter of a sixth embodiment.

Next, a displacement meter of a sixth embodiment will be described with reference to FIG. 8. FIG. 8 is a configuration diagram of the displacement meter of the sixth embodiment. As shown in FIG. 8, in the displacement meter of this embodiment, the opening 9 of the light deflection portion 8 serves as the aperture stop 4 instead of providing the aperture stop 4. Accordingly, it is possible to decrease the number of components and realize a decrease in cost.

In addition, the configuration of this embodiment may be applied to the configuration described in other examples.

Seventh Embodiment

So far, in the first embodiment to the sixth embodiment, examples of using the laser diode or the like as the light source have been described. However, there are following problems if the coherent light source such as the laser diode is adopted.

When the coherent light source is adopted, the light scattered by the general measurement object 2 which can be regarded as an optically rough surface generates a speckled interference pattern having a random intensity distribution called speckle on the surface of the sensor array 5. When the coherent light source is used in the displacement meter, the speckle moving in synchronization with the displacement of the measurement object 2 is detected.

The speckle is formed depending on the curvature of the received light flux wave surface. If the wave surface of the illumination light flux is a substantially planar wave if the measurement object 2 is a plane, the reflected light flux is also a substantially planar wave regardless of the working distance and a speckle independent of the working distance is formed. On the other hand, since the measurement object 2 having a curvature gives a curvature to the reflected light flux wave surface, the speckle formed by the working distance changes. Thus, if the measurement object 2 having a curvature is measured, the displacement magnification of the speckle changes if the working distance changes and a large error occurs if a constant optical magnification is assumed.

Here, if the curvature and the working distance of the measurement object 2 are known, the displacement magnification of the speckle can be calculated.

However, it is desirable to allow changes in working distance and enable robust measurements that can be also used with various curvatures without changing settings. Thus, in the seventh embodiment, since an incoherent light source such as an LED is used as the light source 6, the influence of speckle does not appear on the image acquired by the light receiving optical system and the influence of the curvature of the measurement object is eliminated.

That is, the seventh embodiment is characterized in that an incoherent light source such as an LED is used as the light source 6 of the displacement meters of the first to third, fifth, and sixth embodiments. Accordingly, even in the measurement object 2 having a curvature, robust measurement is possible for changes in the curvature and the working distance of the measurement object 2.

Eighth Embodiment

Next, a method of manufacturing an article (metal plate, pressed product, paper, fiber, etc.) using the displacement meter described above will be described. The article is manufactured by: conveying a conveyed object (object) by a conveying device; measuring a conveyance amount of the conveyed object as a displacement using the displacement meter; and performing cutting, pressing, etc. on the conveyed object at a timing of detecting a desired conveyance amount. Alternatively, it is also possible to stop the processing by detecting the deviation of the conveyance amount from a predetermined value.

According to this article manufacturing method, this method can be applied to the manufacturing of articles in more objects and environments than before.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-11350, filed Jan. 28, 2020, which is hereby incorporated by reference wherein in its entirety.

What is claimed is:
1. A displacement meter comprising:
a light source;
an illumination optical system configured to form a light intensity distribution at a predetermined position on an optical axis by using light from the light source such that a light intensity at a peripheral portion of the light intensity distribution is stronger than a light intensity at a center portion of the light intensity distribution;
a light deflection portion which has an opening on the optical axis and a reflection part configured to reflect light of the light intensity distribution formed by the illumination optical system at the predetermined position;
a first lens unit configured to collect light reflected by the reflection part and illuminate a measurement object;
a sensor array configured to detect light reflected by the measurement object and passing through the opening of the light deflection portion through the first lens unit; and
a measurement unit configured to detect a displacement of the measurement object by using outputs of the sensor array at different timings.

2. The displacement meter according to claim 1, wherein the illumination optical system forms the light intensity distribution due to spherical aberration of a spherical lens.

3. The displacement meter according to claim 2, wherein the illumination optical system includes a plano-convex lens and the light source is disposed on a convex side of the plano-convex lens.

4. The displacement meter according to claim 1, further comprising:
an aperture stop which is provided in front of a light receiving surface of the sensor array,
wherein the first lens unit and the aperture stop constitute an object side telecentric optical system.

5. The displacement meter according to claim 4, wherein the opening of the light deflection portion serves as the aperture stop.

6. The displacement meter according to claim 1, wherein the illumination optical system forms a ring-shaped light amount distribution as the light intensity distribution.

7. The displacement meter according to claim 1, wherein the measurement unit calculates a correlation of outputs of the sensor array at different timings and detects a displacement of the measurement object from a peak position of the correlation calculation result.

8. The displacement meter according to claim 1, wherein the reflection part of the light deflection portion has a ring shape.

9. The displacement meter according to claim 1, wherein the reflection part of the light deflection portion has a plurality of plane mirrors.

10. The displacement meter according to claim 1, wherein the illumination optical system includes a diffraction grating.

11. The displacement meter according to claim 10, wherein the light source is a coherent light source.

12. The displacement meter according to claim 1, further comprising:
a second lens unit which is provided between the light deflection portion and the sensor array.

13. The displacement meter according to claim 12, wherein the second lens unit has a telecentric optical system on the sensor array side.

14. The displacement meter according to claim 1, wherein the first lens unit includes a plurality of lenses.

15. The displacement meter according to claim 1, wherein the light source is an incoherent light source.

16. A displacement meter comprising:
a light source;
an illumination optical system configured to form a light intensity distribution at a predetermined position on an optical axis by using light from the light source such that a light intensity at a peripheral portion of the light intensity distribution is stronger than a light intensity at a center portion of the light intensity distribution;

a light deflection portion which has a reflection part on an optical axis and configured to guide light of the light intensity distribution formed by the illumination optical system to a measurement object through an opening in the periphery of the reflection part;

a first lens unit configured to collect light passing through the opening and illuminate the measurement object;

a sensor array configured to detect light reflected by the measurement object and reflected by the reflection part of the light deflection portion through the first lens unit; and a measurement unit configured to detect displacement of the measurement object by using outputs of the sensor array at different timings.

17. An article manufacturing method comprising:

measuring displacement of an object by using a displacement meter; and processing an object based on the measured displacement, wherein the displacement meter includes:

a light source, an illumination optical system configured to form a light intensity distribution at a predetermined position on an optical axis by using light from the light source such that a light intensity at a peripheral portion of the light intensity distribution is stronger than a light intensity at a center portion of the light intensity distribution,     a light deflection portion which has an opening on the optical axis and a reflection part configured to reflect light of the light intensity distribution formed by the illumination optical system at the predetermined position,     a first lens unit configured to collect light reflected by the reflection part and illuminate a measurement object,     a sensor array configured to detect light reflected by the measurement object and passing through the opening of the light deflection portion through the first lens unit, and     a measurement unit configured to detect a displacement of the measurement object by using outputs of the sensor array at different timings.

18. An article manufacturing method comprising:

measuring displacement of an object by using a displacement meter; and processing an object based on the measured displacement, wherein the displacement meter includes:

a light source, an illumination optical system configured to form a light intensity distribution at a predetermined position on an optical axis by using light from the light source such that a light intensity at a peripheral portion of the light intensity distribution is stronger than a light intensity at a center portion of the light intensity distribution,     a light deflection portion which has a reflection part on an optical axis and configured to guide light of the light intensity distribution formed by the illumination optical system to a measurement object through an opening in the periphery of the reflection part,     a first lens unit configured to collect light passing through the opening and illuminates the measurement object,     a sensor array configured to detect light reflected by the measurement object and reflected by the reflection part of the light deflection portion through the first lens unit, and     a measurement unit configured to detect a displacement of the measurement object by using outputs of the sensor array at different timings.

\* \* \* \* \*